(12) United States Patent
Dillaway et al.

(10) Patent No.: US 7,770,206 B2
(45) Date of Patent: Aug. 3, 2010

(54) DELEGATING RIGHT TO ACCESS RESOURCE OR THE LIKE IN ACCESS MANAGEMENT SYSTEM

(75) Inventors: Blair Brewster Dillaway, Clyde Hill, WA (US); Brian LaMacchia, Seattle, WA (US); Muthukrishnan Paramasivam, Seattle, WA (US); Charles F. Rose, III, Redmond, WA (US); Ravindra Nath Pandya, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/077,574

(22) Filed: Mar. 11, 2005

(65) Prior Publication Data

US 2006/0206925 A1    Sep. 14, 2006

(51) Int. Cl.
    G06F 7/04    (2006.01)
(52) U.S. Cl. ........................................................ 726/2
(58) Field of Classification Search ...................... 726/2
    See application file for complete search history.

(56) References Cited

U.S. PATENT DOCUMENTS

| | | | | |
|---|---|---|---|---|
| 5,224,163 A | * | 6/1993 | Gasser et al. | 380/30 |
| 5,649,099 A | * | 7/1997 | Theimer et al. | 726/4 |
| 6,601,171 B1 | * | 7/2003 | Carter et al. | 713/175 |
| 6,711,679 B1 | * | 3/2004 | Guski et al. | 713/156 |
| 2002/0026582 A1 | * | 2/2002 | Futamura et al. | 713/170 |
| 2002/0178356 A1 | * | 11/2002 | Mattila | 713/156 |
| 2003/0140226 A1 | * | 7/2003 | Yamamoto et al. | 713/156 |

FOREIGN PATENT DOCUMENTS

GB        2357225        7/2003

* cited by examiner

*Primary Examiner*—Nasser Moazzami
*Assistant Examiner*—Michael S McNally
(74) *Attorney, Agent, or Firm*—Woodcock Washburn LLP (57) ABSTRACT

A resource of a first organization provides access thereto to a requestor of a second organization. A first administrator of the first organization issues a first credential to a second administrator of the second organization, including policy that the second administrator may issue a second credential to the requestor on behalf of the first administrator. The second administrator issues the second credential to the requester, including the issued first credential. The requestor requests access from the resource and includes the issued first and second credentials. The resource validates that the issued first credential ties the first administrator to the second administrator, and that the issued second credential ties the second administrator to the requester. The resource thus knows that the request is based on rights delegated from the first administrator to the requester by way of the second administrator.

18 Claims, 5 Drawing Sheets

DELEGATING RIGHT TO ACCESS RESOURCE OR THE LIKE IN ACCESS MANAGEMENT SYSTEM

TECHNICAL FIELD

The present invention relates to an access management system whereby access to a resource such as digital content or a digital service is provided only in accordance with a corresponding grant of access, such as for example may be expressed in a digital license or certificate. More particularly, the invention relates to delegating rights to access such a resource in a manner such that the access to the resource is granted even without specific prior knowledge of the delegation of the access grant.

BACKGROUND OF THE INVENTION

Access management is highly desirable in connection with granting access to a digital resource such as a digital service or digital content, which may include digital audio, digital video, digital text, digital data, digital multimedia, etc. The resource can be the aforementioned content or the like, a server or the like having a library of content or the like, or any other or digital repository of information that a user might wish to access such as for example an electronic mail server, a gaming server, a network access server or point, etc. Likewise, the resource can be a service, such as a printer, a compiler, a renderer, or the like.

Typically, in an access management context, a requestor is granted access to a resource upon presenting a request with a credential identifying the requester. For example, the credential may comprise a digital certificate issued to and identifying the requestor. In any event, the credential is typically issued to the requestor by an issuer that is known to and trusted by the resource. For example, within the context of an organization, the resource may be a data file managed by a data server and the issuer may be an identity server set up by an administrator to provide an identifying credential to each member of the organization.

Upon satisfying itself based on the credential and perhaps other information that the requestor is indeed entitled to access to the requested resource, such resource then provides such access. For example, if the request is for a data file from the resource, the resource provides such data file, and if the request is to review information available from the resource, the resource allows the requestor to in fact review such information.

Notably, in at least some instances the resource provides data to the requester. If so, the resource may choose to encrypt the data according to a format that allows the requestor to decrypt same, but not others. For example, it may be that the presented credential of the requestor is a digital certificate that includes a public key associated therewith, and the resource encrypts the provided data according to the public key of the presented credential. Thus, the requestor may apply a corresponding private key associated with the digital certificate to the encrypted data to reveal same.

Also notably, the resource may choose to attach terms and conditions to the encrypted data that the requestor must abide by. If so, and again presuming that the presented credential of the requestor is a digital certificate that includes a public key associated therewith, the resource may encrypt the provided data according to a selected symmetric key, encrypt the symmetric key according to the public key of the presented credential, and place the encrypted symmetric key and the terms and conditions in a digital license. Thus, the requestor may apply the corresponding private key associated with the digital certificate to the encrypted symmetric key of the license to reveal same, and then apply the decrypted symmetric key to the encrypted data to reveal same, presuming of course that the terms and conditions in the license so allow.

Typically, the resource is presumed to have prior knowledge of the requestor, or at least the administrator that provides the credential of the requestor, and thus provides access to the requestor based on same. For example, it may be that the resource follows a rule that only allows access to a particular set of requesters known to the resource, or that only allows access to requesters that provide a credential from a particular administrator already known to the resource. If a requester is not within such a group, then, such requestor is not provided with access by the resource according to the rule.

However, situations exist where the requestor should be provided access even though not previously known to the resource and not within the rule followed by the resource, either as being from a particular set of requestors or having a credential from a particular administrator. For example, a resource within an organization ABC may be set up to follow an access rule that provides access to all employees from ABC, as signified by each such employee having an appropriate credential from an ABC administrator. Nevertheless, it may be that ABC has engaged contractors from XYZ and such XYZ contractors should also have access to the resource.

In the prior art, then, the XYZ contractors could be given access to an ABC resource by giving each such XYZ contractor an ABC credential from the ABC administrator. However, the ABC administrator may be loathe to do so, especially if such an ABC credential could have the effect of the XYZ contractor being treated like an ABC employee, or could allow the XYZ contractor to improperly access another ABC resource.

As an alternative, and also in the prior art, the XYZ contractors could be given access to an ABC resource by altering the access rules for that ABC resource. For example, such access rules could be altered to allow the ABC resource to provide access to a particular set of XYZ contractors based on such contractors having a credential from an XYZ administrator. However, it is to be appreciated that altering the access rules for a resource can be cumbersome and burdensome, especially if such access rules must be continuously altered on an ongoing basis according to changes in access policy. Moreover, it is to be appreciated that altering the access rules for each of the many resources that can exist within a particular organization can easily become a gargantuan task.

Similarly, it may se the case that only some employees of ABC are normally allowed to access a given resource. Over time, there may be requirements to allow other employees temporary access to the resource. For example, an employee with authorized access may need to grant a subordinate temporary access while they are traveling. It could also be the case they wish to allow an assistant access so they may act on their behalf for certain business processes.

In the prior art, then, the ABC employees who don't normally have access to the resource would be given access to the resource in the same manner as the originally authorized employees. If this requires issuing new credentials, or setting new account attributes, the ABC administrator may be loathe to do so, especially if doing so could have the effect of granting the employees greater access rights than may be desired or requiring additional administrative actions be taken to remove such rights when the need for such access is no longer valid.

Thus, a need exists for a method and mechanism by which a resource can provide access to a requester not previously known thereto based on access rules or the like. In particular, a need exists for a method and mechanism by which the resource need only look to a defined source of trust, be it an administrator or the like, to determine whether access should be provided to a requestor. Further, a need exists for a method and mechanism by which the defined source of trust can identify whether a requestor is to be provided access, regardless of whether the requestor is internal to or external from the organization of the defined source of trust.

SUMMARY OF THE INVENTION

The aforementioned needs are satisfied at least in part by the present invention in which a method is provided for a resource of a first organization to provide access thereto to a requestor of a second organization. The first organization has a first administrator trusted by the resource, and the second organization has a second administrator, where each of the first and second administrators issues credentials to entities. Each credential as issued by an administrator to an entity ties the entity to the issuing administrator and evinces a relationship between the entity and the issuing administrator.

In the method, the first administrator issues to the second administrator a first credential, where the issued first credential states policy that the second administrator may issue a second credential to the requester on behalf of the first administrator. The second administrator in fact issues to the requestor the second credential on behalf of the first administrator, where the issued second credential may include or reference the issued first credential. The requestor of the second organization thereafter requests access from the resource of the first organization and in doing so includes with the request the issued first credential and the issued second credential.

The resource receives the request, and validates the issued first credential to confirm that the issued first credential ties the trusted first administrator to the second administrator, and also to confirm that the policy of the issued first credential allowed the second administrator to issue the second credential to the requestor. Also, the resource validates the issued second credential to confirm that the issued second credential ties the second administrator to the requester. Presuming such validations succeed, the resource proceeds with the request to access the resource knowing that such request from such requestor is based on rights delegated from the trusted first administrator to the requester by way of the second administrator. Thus, the resource of the first organization can recognize and grant access to the requester of the second organization, even though such requestor is not issued any credential by the trusted first administrator of the first organization.

Similarly, an end-user could be allowed to delegate some or all of their rights to another end-user. In the method, the first administrator issues to a first end-user a first credential, where the issued first credential includes information necessary to determine the first end-user's rights to a resource and states policy that the first end-user may issue a second credential to a requestor on behalf of the first administrator. The first end-user in fact issues to the requestor the second credential on behalf of the first administrator, where the issued second credential may include or reference the issued first credential. The requester thereafter requests access from the resource and in doing so includes with the request the issued first credential and the issued second credential. These credentials may then be validated and used by the resource in the manner described previously by the resource to determine if access should be granted.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
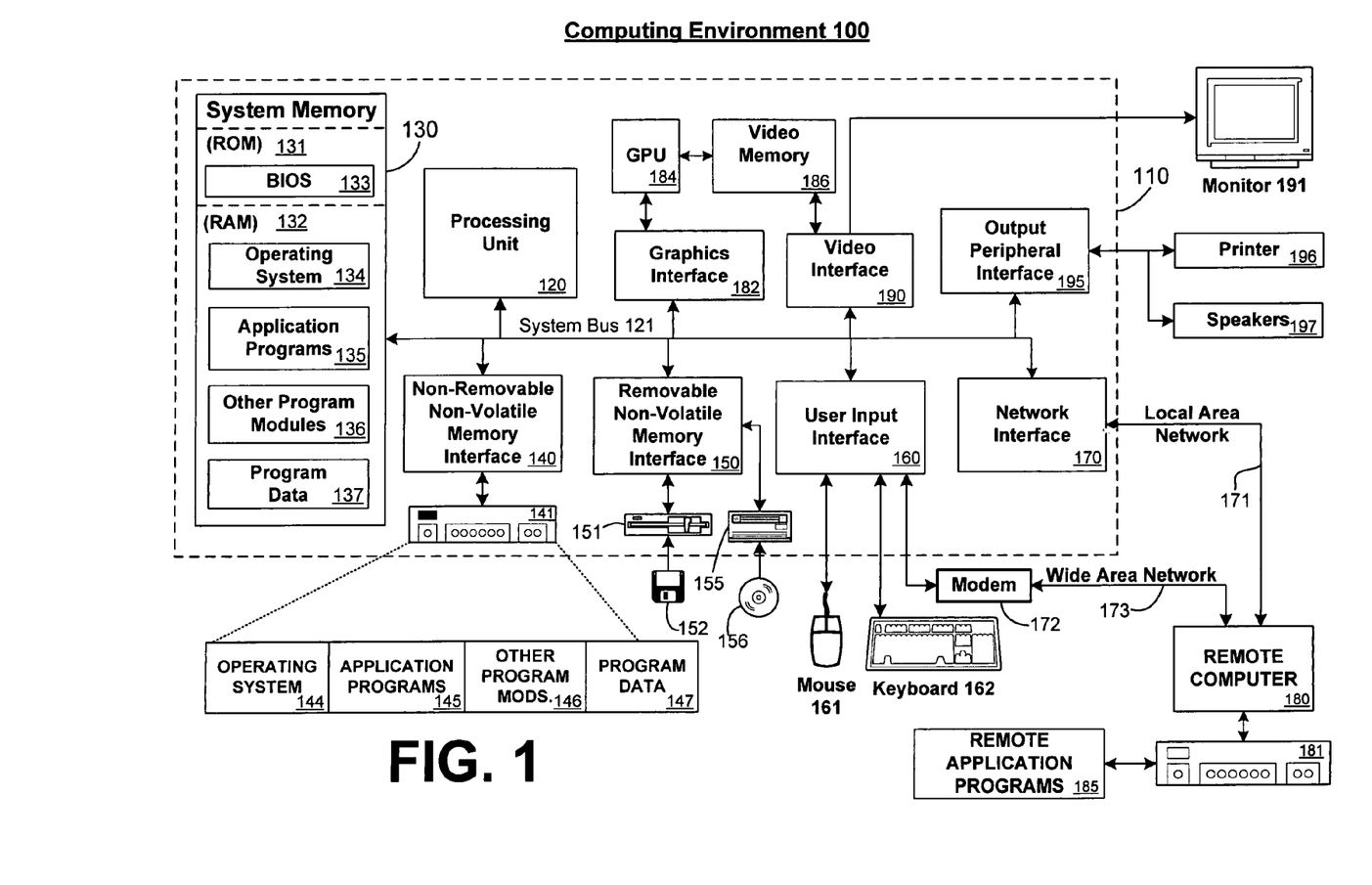
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
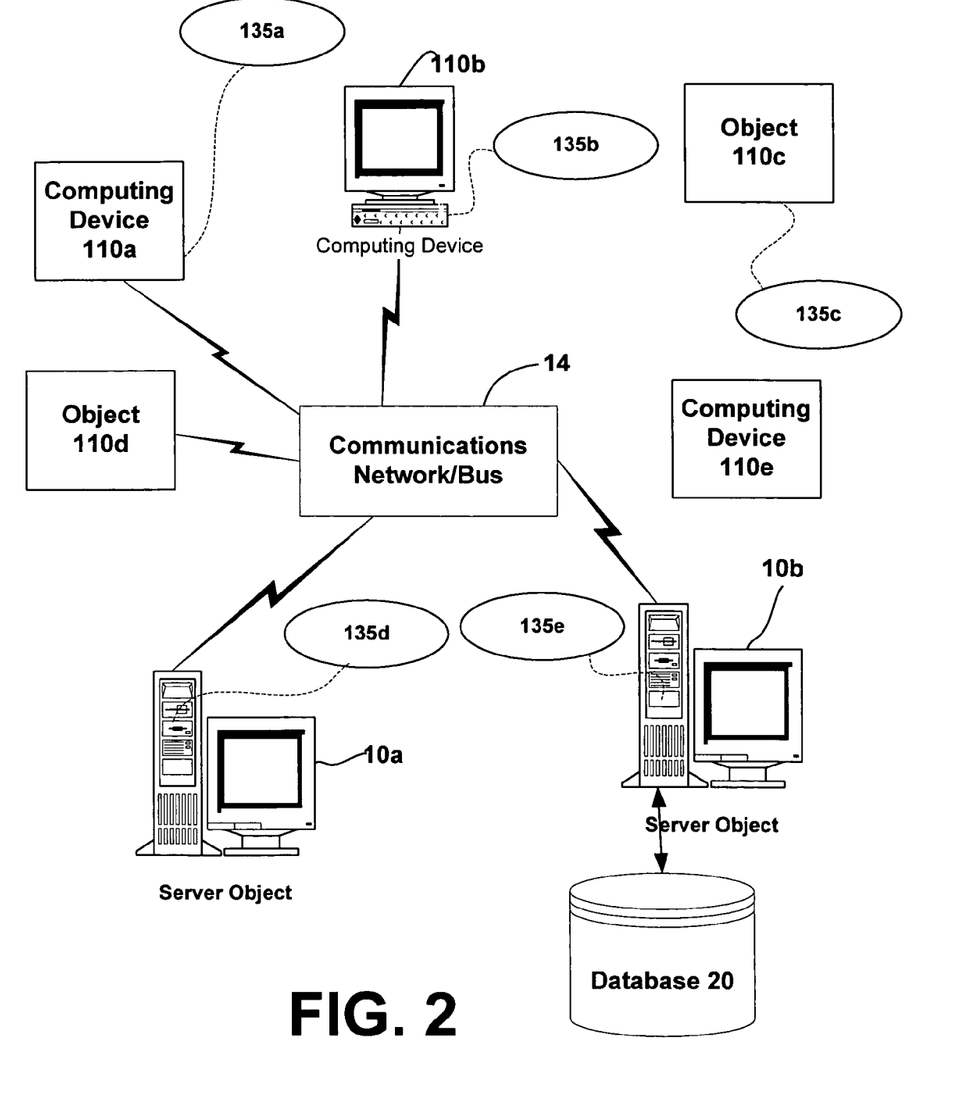
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Access Management Overview

Figure 3:
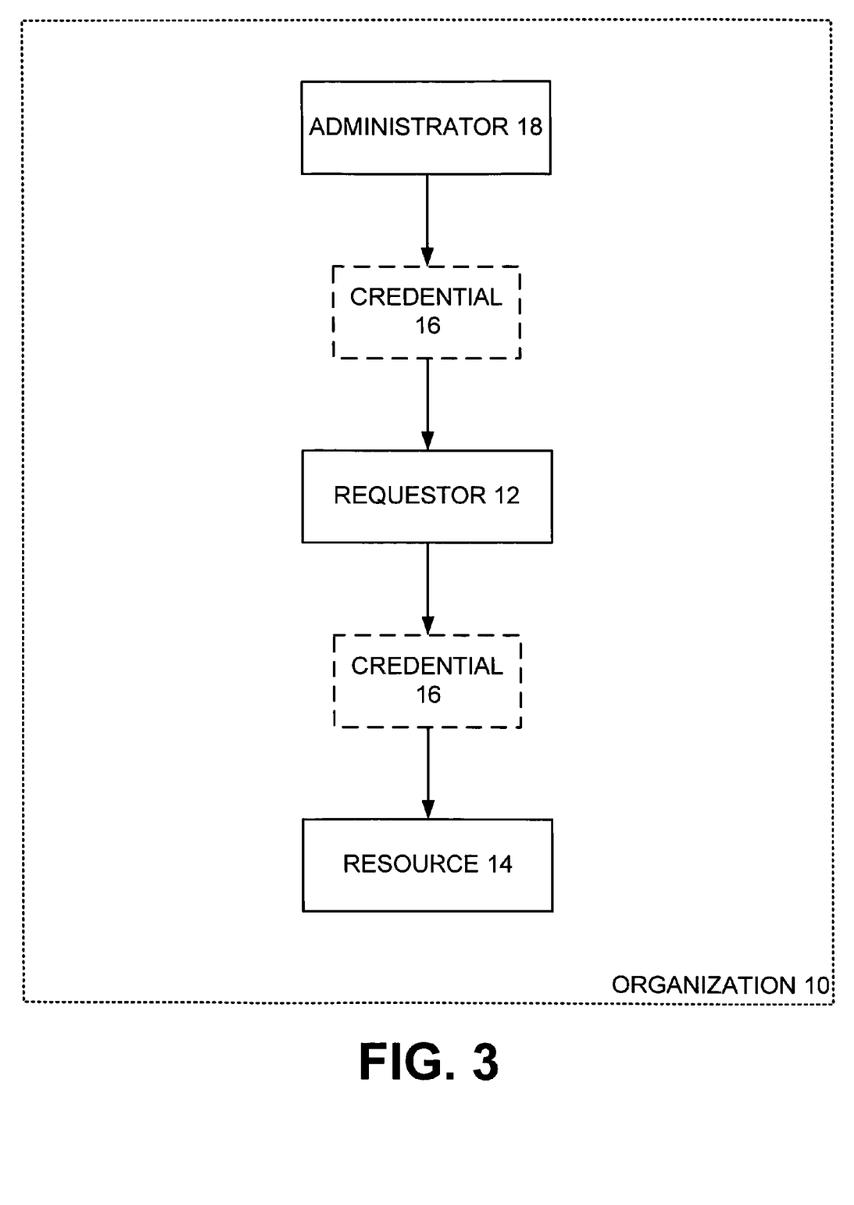
FIG. 3 is a block diagram showing an architecture wherein an organization has a resource, an administrator trusted by the resource, and a requestor requesting access to the resource based on a credential from the administrator.

As is known, and referring now to FIG. 3, in access management as applied to digital information, within the context of an organization 10 or the like, a requester 12 within the organization 10 requesting information from a resource 14 of the organization 10 must present a credential 16 to the resource 12 that identifies the requestor 12, and that may for example include the relationship of the requestor 12 to the organization 10.

As may be appreciated, the organization 10 may be any appropriate type of organization without departing from the spirit and scope of the present invention. For example, the organization 10 may be a public corporation, a private company, a governmental body, a non-profit charity, a research foundation, etc. As may also be appreciated, the requestor 12 within the organization 10 may be any appropriate requestor, also without departing from the spirit and scope of the present invention. For example, the requestor 12 may be any employee, a director, a supervisor, an officer, etc.

Generally, the resource 14 receives requests for access to digital information or services and provides such access according to pre-defined rules. Such digital information may include digital content or data or the like, and such digital services may include printing services, rendering services, data transformation services, or the like. Thus, such resource 14 and such digital information may be any appropriate digital resource and digital information without departing from the spirit and scope of the present invention.

The pre-defined rules that the resource 14 follows in providing access to a requestor 12 may be any rules without departing from the spirit and scope of the present invention. Within the context of the present invention, such rules at least implicitly require that the requestor 12 present the credential 16 to the resource 12, and may also require that the requestor 12 have a minimum level of position within the organization 10, as might be set forth within the credential 16, that the requestor 12 have the right to access the resource 14, as might be set forth within the credential 16, and the like. Such rules might for example also require that the request from the requester 12 be received at a particular time of day, that the requestor 12 be accessing the resource 14 by way of a particular type of connection, etc.

The credential 16 as presented by and representing the requestor 12 maybe any appropriate credential without departing from the spirit and scope of the present invention. Typically, the credential 16 is a digital certificate as issued to the requestor 12 by an administrator 18 of the organization 10 that is trusted by the resource 14, but could be some other form of identifying indicia. Presuming that the credential 16 is in fact a digital certificate 16, such digital certificate 16 may have information therein as is appropriate for identifying the requestor 12. For example, the digital certificate 16 may include the name of the requestor 12, the position of the requester 12 within the organization, the rights of the requestor 12 within the organization 10, a validity period, etc. Typically, such digital certificate 16 is signed based on the contents thereof and according to a private key of a public-private key pair, and may be validated according to an attached chain of certificates including the corresponding public key.

The digital certificate 16 may itself have an associated public-private key pair, with the public key in the certificate 16. Thus, the resource 14 may respond to a requestor 12 with data encrypted either directly or indirectly according to the public key of the certificate 16 of such requestor 12. Accordingly, the requestor 12 may access such data by appropriate application of the corresponding private key of the certificate 16.

The administrator 18 may be any appropriate administrator that is trusted by the resource 14 in the course of making access determinations without departing from the spirit and scope of the present invention, presuming of course that the administrator 18 is capable of issuing credentials/certificates 16 to requestors 12. Presumably, the rules of the resource 14 require that any request from any requestor be tied back to the trusted administrator 18 by including a credential/certificate 16 therefrom.

Delegating Right to Access Resource 14

As was set forth above, a resource 14 within an organization 10 in deciding whether to provide access to a requestor 12 typically reviews the credentials 16 proffered by the requestor 12 and ensures that the credentials 16 tie back to the trusted administrator 18 of the organization 10. However, and significantly, a requestor 12 can oftentimes lack the appropriate credential 16, or not be allowed access to a resource 14 based on a proffered credential 16 alone, and yet should nevertheless be allowed access to the resource 12 based on decisions by other trustworthy entities. In addition, a requestor 12 can oftentimes not be within the organization 10 and not have credentials 16 from the organization 10, and yet should nevertheless be allowed access to the resource 14 of the organization.

More generally, in an era where an application can be multi-tiered, distributed across multiple organizations 10, spanning multiple administrative boundaries, and/or involve multiple entities with dynamic relationships, access to resources 14 in accordance with operation of such an application necessarily requires crossing boundaries including administrative environments. Thus, a resource 14 from a first organization 10 needs to be able to recognize and grant access to a requester 12 from a second organization 10 that is not credentialed by the trusted administrator 18 of the first organization 10. However, and again, the resource 14 of the first organization 10 should at least still require that the requestor 12 from the second organization 10 establish some tie back to the trusted administrator 18 of the first organization 10.

While the rules for the resource 14 of the first organization 10 can be updated on a regular basis to alter who may access such resource 14, either by changing specific requester rights or representing the tie of the requestor 12 from the second organization 10 to the administrator 18 of the first organization 10, such updating is cumbersome, burdensome, fraught with risk, and an avenue for security risks. Accordingly, and in one embodiment of the present invention, the rules for the resource 14 of the first organization 10 only require that the requester 12 from the second organization 10 be delegated the right to access such resource 14 either directly or indirectly from the administrator 18 of the first organization 10. Such delegation may be embodied as a delegation policy in a credential 16 such as a digital certificate 16. Significantly, by requiring delegation by way of such credential/certificate 16, the certificate 16 may be provided with constraints that limit or restrict the rights the requestor 12 has with regard to the resource 14.

Figure 4:
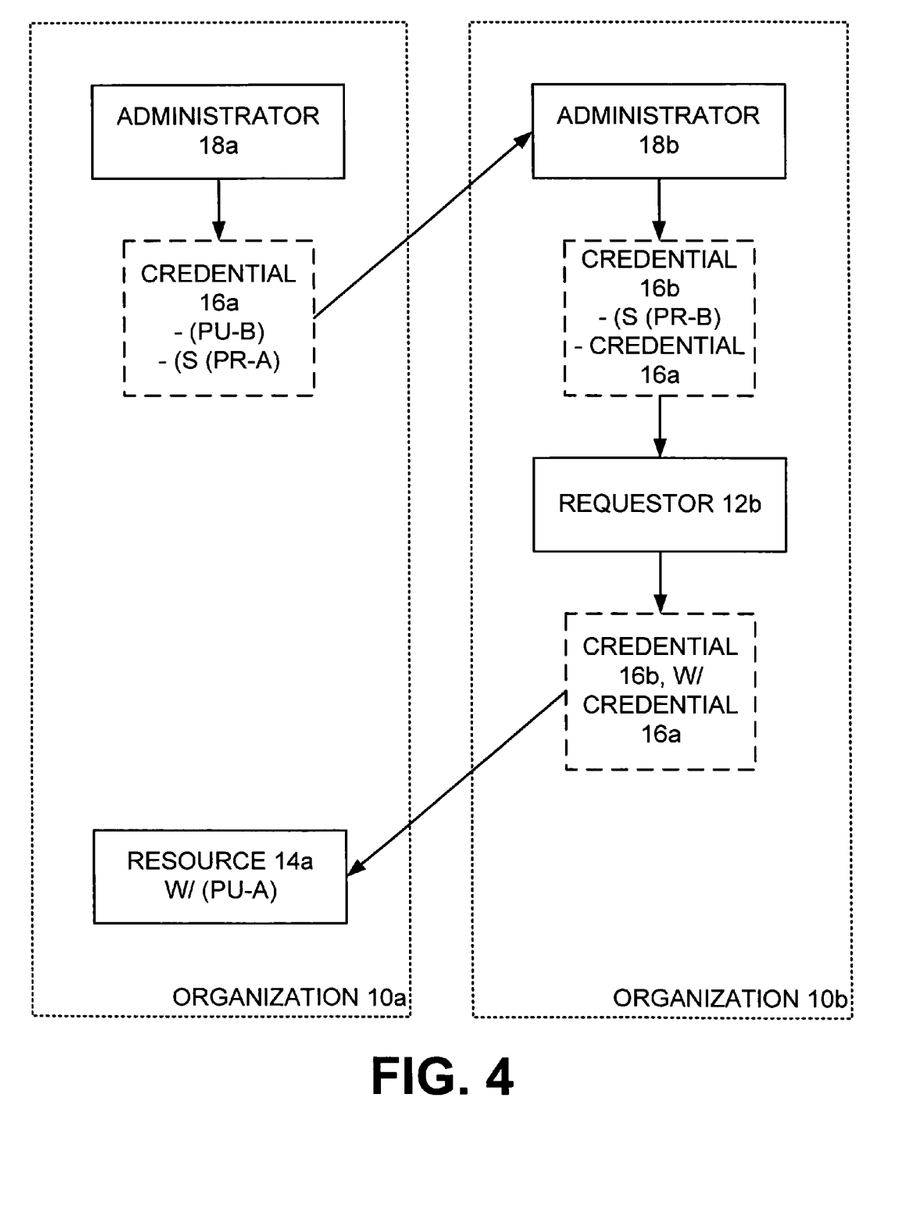
FIG. 4 is a block diagram showing an architecture wherein a first organization has a resource and a first administrator trusted by the resource, a second organization has a requester and a second administrator, and the requestor of the second organization requests access to the resource of the first organization based on a delegating credential from the administrator of the first organization to the administrator of the second organization and a delegated credential from the administrator of the second organization to the requester, all in accordance with one embodiment of the present invention.
Figure 5:
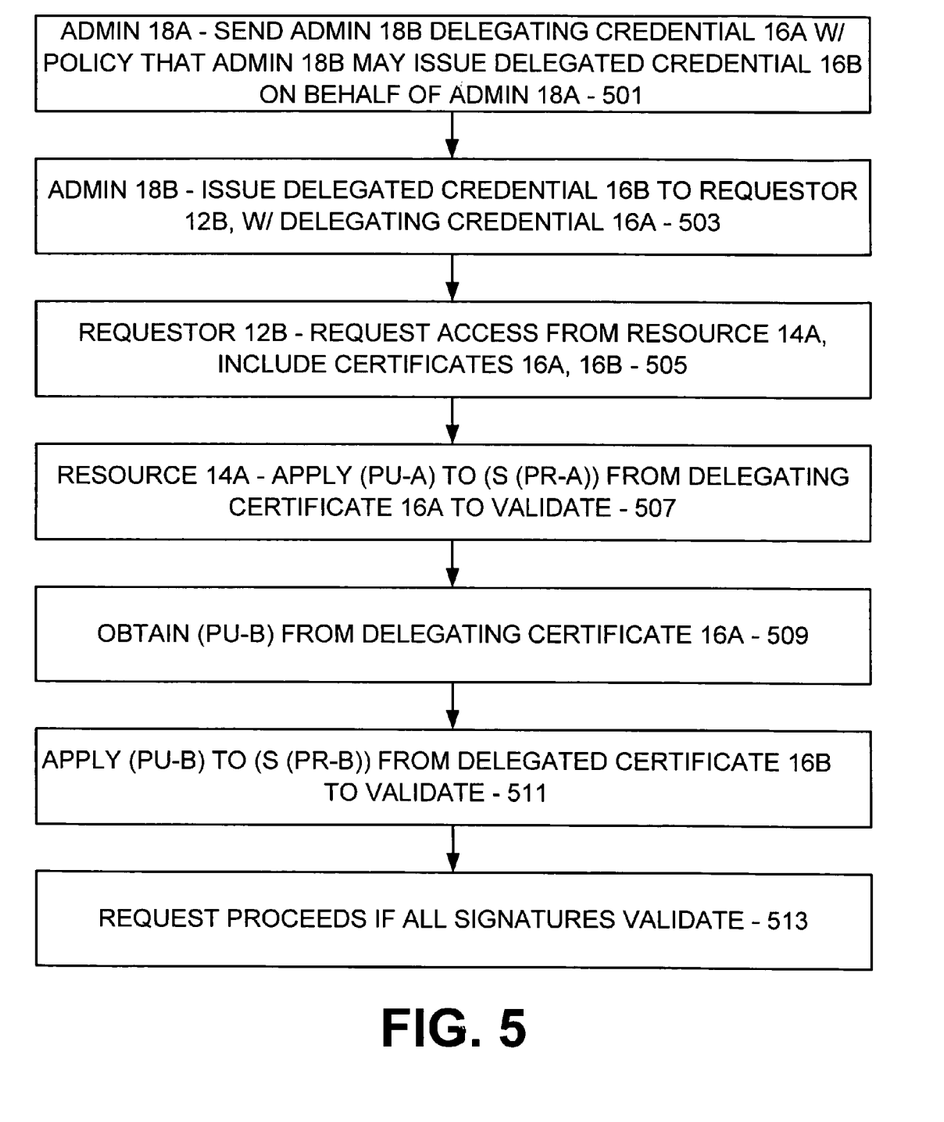
FIG. 5 is a flow diagram showing key steps performed by the entities shown in FIG. 4 in accordance with one embodiment of the present invention.

Turning now to FIG. 4, if it is presumed that two organizations 10a, 10b respectively have an administrator 18a, 18b, that the resource 14a is associated with organization 18a and trusts administrator 18a only, and that the requestor 12b is associated with the organization 18b, the present invention may be effectuated in the following manner and as shown in FIG. 5. Preliminarily, administrator 18a of organization 10a sends administrator 18b of organization 10b a credential 16a stating policy to the effect that administrator 18b of organization 10b may issue a credential 16b on behalf of administrator 18a of organization 10a and with respect to one or more resources 14a of the organization 10a (step 501). Such credential 16a, then, is a delegation of the issuing right of the administrator 18a of the organization 10a to the administrator 18b of the organization 10b. Note that the credential 16a may state that the credential 16b can be issued by the administrator 18b of the organization 10b to a particular requestor 12b of the organization 10b, or may specify a particular set of such requesters 12b, or may specify all requestors 14b of the organization 10b.

At any rate, the administrator 18b of the organization 10b with the delegating credential 16a from the administrator 18a of the organization 10a and based thereon in fact issues the delegated credential 16b to the requestor 12b of the organization 10b. Significantly, and in one embodiment of the present invention, the credential 16b ties the requestor 12b to the administrator 18b, and the credential 16a ties the administrator 18b to the administrator 18a. For example, and in the case where the credentials 16a, 16b are digital certificates 16a, 16b, and as shown in FIG. 4, each administrator 18a, 18b has a public-private key (PU-A, PU-B, PR-A, PR-B), the certificate 16a includes the public key of the administrator 18b (PU-B) and is signed by the private key of the administrator 18a (PR-A), and the certificate 16b is signed by the private key of the administrator 18b (PR-B).

Thus, when the administrator 18b issues the delegated credential/certificate 16b to the requestor 12b, such administrator 18b includes with the certificate 16b the delegating certificate 16a, in the manner of a chain of certificates (step 503). Thereafter, and at some point, the requestor 12b in fact requests access from the resource 14a, and in doing so includes with the request the chain of certificates 16a, 16b (step 505). Upon receiving the request, the resource 14a as part of deciding whether to honor same validates the chain of certificates 16a, 16b to determine that the trusted administrator 18a in fact delegated the right to so access to the requestor 12b by way of the administrator 18b. In particular, based on presumed knowledge of (PU-A), the resource 14a applies such (PU-A) to (S (PR-A)) from the delegating certificate 16a to validate same (step 507), and presuming such validation succeeds the resource 14a then obtains (PU-B) from the delegating certificate 16a (step 509) and applies such (PU-B) to (S (PR-B)) from the delegated certificate 16b to validate same (step 511). Here, presuming such validation succeeds, the request can proceed with the resource 14a being secure in the knowledge that the request from the requestor 12b is based on rights delegated from the trusted administrator 18a by way of the administrator 18b (step 513).

As thus far set forth, the chain of delegation extends from the trusted administrator 18a to the administrator 18b and from the administrator 18b to the requestor 12b. However, and significantly, delegation can extend multiple links from a source of trust as honored by the resource 14a, and can extend with multiple branches to multiple requestors 12b, all without departing from the spirit and scope of the present invention. Moreover, and in one embodiment of the present invention, by using credentials 16 to establish the links, each such credential 16 can be provided with policy that a requestor 12b must satisfy before a resource 14a provides access thereto.

Thus, it may be that the following distributed policy is created by way of appropriate issuance of credentials 16:

Resource 14a within organization 10a trusts administrator 18a of organization 10a to determine who may issue credentials 16;

Administrator 18*a* by way of a credential 16 authorizes administrator 18*b* of organization 10*b* to issue credentials 16 to requestors 12*b* of such organization 10*b*;

Administrator 18*a* by way of a credential 16 authorizes administrator 18*c* of organization 10*c* to issue credentials 16 to requestors 12*c* of such organization 10*c* (not shown) that have a role as a purchaser or reviewer, and also authorizes administrator 18*c* to be able to delegate such abilities to sub-administrators 18 in such organization 10*c*; and Administrator 18*c* by way of a credential 16 authorizes a purchasing sub-administrator 18*c*1 thereof to issue credentials 16 to purchasing requestors 12*c*1 of the organization 10*c*.

Thus, when the resource 14*a* receives a request for access from a requestor 12*c*1 accompanied by a chain of credentials 16 from administrators 18*a*, 18*c*, and 18*c*1, the resource 14*a* can employ the policy stated within all of such credentials 16 to determine whether to grant access. More generally, each link as represented by a credential 16 represents a constrained delegation of the right to identify requestors 12 that can gain access to a resource 14*a*, and each link also provides authoritative statements declaring policy that a requestor 12 must follow before such access is provided. Significantly, by storing such policy in each credential 16, the resource 14*a* need not refer to any particular central repository of policy and need not have any prior knowledge of the requestor 12 or any administrator 18 other than 18*a*. Instead, the resource 14*a* honors the policy in a chain of credentials 16 because the chain originates at a point of trust, administrator 18*a*, and ends at the requestor 12 requesting access from the resource 14*a*, and because each credential 16 in the chain ties such requestor 12 back to such trusted administrator 18*a* by way of the validated signature thereof.

It is to be appreciated that policy as set forth within a credential 16 can be any policy without departing from the spirit and scope of the present invention. For example, the policy can provide the possessor of such credential 16 with full authority to access all resources 14*a* of the organization 10*a*, or can set limits with regard to specific requestors 12 that can request based on the credential 16, specific resources 14*a* that can be accessed based on the credential 16, time limitations, geographic limitations, an expiration, restrictions on access rights, restrictions on communications protocols, and the like. The policy within a credential 16 may also require that the resource 14*a* check with a revocation list to determine that the credential 16 has not been revoked. The policy could even specify a maximum number of linked credentials 16, conditions precedent to exercising rights, or actions that must be performed subsequent to exercising rights. Conceivably, the policy could even refer to one or more external locations at which additional policy can be found.

Policy within a credential 16 may be expressed in any appropriate manner without departing from the spirit and scope of the present invention. For example, such policy may be expressed in a policy statement of the form:

Principal P
Has the right to assert
    Assertions matching A*
    To principals of type P*
    Subject to conditions C
Issue by I
Validity date-time D Where:

P is a reference to a specific principal who is allowed to delegate.

The right to assert can be explicit or implied, but indicates that P may create assertions meeting the constraints of the delegation authorization. Such assertions would be encoded in the form of a credential 16 signed by P.

A* is one or more patterns which all valid delegation assertions must match. For example, a pattern of the form "emailName=*@xzy.com possess property role=purchaser" would state that P could assert an entity with an email address in the xyz.com domain has a purchaser role. A pattern of the form "emailName=*@xzy.com read file=\\mysys\foo.txt" would allow P to assert an entity with an email address in the xzy.com domain that can read the specified file.

P* is one or more patterns identifying value entities that P may delegate to. For example: only XYZ Corp. employees holding X.509 certificates are valid delegation targets; or only members of the XZY-Corp domain are valid targets.

C* is zero or more conditions affecting the validity of any delegation by P. These would include temporal constraints such as a maximum time duration a delegation can last, requirements for checking for revocation of the delegation authorization, etc.

I is a reference to the entity issuing the policy along with a digital signature proving origin and insuring integrity.

D is a time period during which the delegation authorization is valid.

The policy statement as set forth above can be encoded in any appropriate manner without departing from the spirit and scope of the present invention. For example, the policy statement could be encoded in an ASN.1 structure for integration into an X.509 certificates or Kerberos ticket. However, recognizing that not all encodings and structures may fully support such policy statement, and in one embodiment of the present invention, the policy statement and the containing credential 16 are constructed according to an eXtensible Markup Language (XML) that defines a standard such the MPEG Rights Expression Language (REL) as approved by the International Organization for Standardization (ISO), which already has requisite syntactic forms designed in.

Note that although the present invention has thus far been set forth in terms of a requester 12 with a pair of linked credentials 16 from two administrators 18, the chain of credentials 16 may extend with any number of links representing any number of administrators 18 and even any number of other requesters 12. Presumably, and as should now be appreciated a requester 12 with a particular chain of credentials 16 and wishing to access a resource 14 based thereon can in fact access such resource 14, but only if the chain of credentials 16 reaches back to a root of trust recognized by the resource, and also only if policy within each credential 16 in fact allows such accessing.

Thus, and significantly, one piece of policy that may be stated in a credential 16 is whether the rights in the credential 16 may be delegated by way of issuance of a linked credential 16 to a particular requestor 12. For example, it may be the case that a first requestor 12 with a first credential 16 to access a particular resource 14 may by way of specific policy within such first credential 16 delegate such ability to access such particular resource 14 to a second requestor 12 by way of issuance of a second credential 16 from the first requestor 12 to the second requestor 12. Likewise, it may be the case that such first requestor 12 can delegate to the second requestor 12 by way of such second credential 16, but that the delegation policy in the first credential 16 restricts the delegation to a specific subset of rights.

Thus, it should be appreciated that with the present invention as set forth above, a first requestor 12 with a first credential 16 can delegate its rights to access a given resource 14 to a second requestor 12 by way of issuance of a second credential 16 thereto, but only if the first requestor 12 is authorized to do so according to policy set forth within the first credential 16. Presumably, the second requestor 12 cannot access the resource 14 based on any other credentials 16 in possession of such second requestor 12.

Generally, in such a delegation, a first administrator 18 known to the resource 14 issues the first requestor 12 a first credential 16 identifying and possibly indicating an allowed resource access. Importantly, the first administrator 18 also states within the first credential 16 a policy to the effect that the first requestor 12 may act as an intermediary and thus grant the right to a second requester 12 to act on behalf of the first requestor 12 for the purpose of accessing the resource 14. Alternative, the policy may be stated in an ancillary credential 16 referencing the first credential 16. The first requestor 12 then issues the second requestor 12 the second credential 16, where the second credential 16 states policy regarding the rights the second requester 12 is to have in accessing the resource 14. As before, the second credential 16 includes or refers to the first credential 16. The second requestor 12 thereafter requests access from the resource 14 and includes the first and second credentials 16 with such request to allow the resource 14 to make an access decision.

In particular, and similar to before, the resource 14 receives the request, and validates the issued second credential 16 to confirm issuance thereof by the holder of the first credential 16, and also validates the issued first credential 16 to confirm issuance thereof by the first administrator 18. The resource 14 then checks that the delegated rights in the second credential 16 conform to the policy in the first credential 16. Presuming such validations and policy checks succeed, the resource 14 proceeds with the request to access knowing that such request from such second requestor 12 is based on rights properly delegated from the first requestor 12. Thus, and again, the resource 14 can recognize and grant access to the second requestor 12 even though such second requestor 12 is not directly issued any credential 16 granting access to the resource 14 by the first administrator 18.

Conclusion

It is to be appreciated that while the present disclosure speaks in terms of a resource 14 performing certain actions, it may in fact be the case that a resource manager is performing such actions on behalf of the resource 14. As may be appreciated, it is in fact oftentimes the case that a resource manager manages a resource; 14 and enforces access control decisions for the resource 14. Nevertheless, unless otherwise necessary, a resource 14 performing an action can be considered the equivalent of a resource manager performing the action on behalf of the resource 14, and vice versa.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which a resource 14 can provide access to a requestor 12 not previously known thereto based on access rules or the like. Instead, the resource 14 need only look to a defined source of trust, be it an administrator 18 or the like, to determine whether access should be provided to a requestor 12. The defined source of trust can identify whether a requester 12 is to be provided access, regardless of whether the requester 12 is internal to or external from the organization 10 of the defined source of trust, by delegating rights to such requestor 12 by way of an issued credential 16.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for a resource of a first organization to provide access thereto to a requestor of a second organization, the first organization having a first administrator trusted by the resource, the second organization having a second administrator, each of the first and second administrators for issuing credentials to entities, each credential as issued by an administrator to an entity tying the entity to the issuing administrator and evincing a relationship between the entity and the issuing administrator, the method comprising:

the first administrator issuing to the second administrator a first credential by transmitting the first credential from a first administrator's computing device over a computer network to a second administrator's computing device, the first credential stating policy that the second administrator may issue a second credential to the requestor on behalf of the first administrator, the first credential comprising a public key of the second administrator (PU-B) and a signed private key of the first administrator (S(PR-A));

the second administrator issuing to the requestor the second credential on behalf of the first administrator by transmitting the second credential from the second administrator's computing device over the computer network to a requestor's computing device, the second credential comprising the first credential, a validity period, a first rule comprising a plurality of time periods within the validity period during which a request for access to the resource of the first organization is accepted, a signed private key of the second administrator (S(PR-B)), and a public key of the second credential;

the requestor of the second organization transmitting the request for access to the resource of the first organization from the requestor's computing device over the computer network to the resource, the request comprising the second credential, and the resource comprising a resource computing device configured to provide access to digital content;

the resource receiving from the requestor the request comprising the second credential;

the resource obtaining a public key of the first administrator (PU-A);

the resource validating the second credential by:
applying the public key of the first administrator (PU-A) to the signed private key of the first administrator (S(PR-A)), obtaining the public key of the second administrator (PU-B) from the first credential, and
applying the public key of the second administrator (PU-B) to the signed private key of the second administrator (S(PR-B)), and determining that the first rule is satisfied by determining that the request was received by the resource during one of the plurality of time periods; and responsive to the resource validating the second credential, the resource encrypting the digital content with the public key of the second credential and transmitting encrypted digital content to the requestor over the computer network, whereby the requestor decrypts the encrypted content with a private key of the second credential.

2. The method of claim 1 wherein the first administrator issues to the second administrator the first credential stating policy that the second administrator may issue the second credential to a particular set of entities including the requestor.

3. The method of claim 1 wherein the first administrator issues to the second administrator the first credential stating further policy that restricts rights the requestor has with regard to the resource.

4. The method of claim 1 comprising:
the first administrator issuing to the second administrator the first credential further stating policy that allows the requestor access to the resource.

5. The method of claim 1 comprising issuing each credential to include each policy therein specified as:

| |
|---|
| Principal P |
| Has the right to assert |
|     Assertions matching A* |
|     To principals of type P* |
|     Subject to conditions C |
| Issue by I |
| Validity date-time D | where P is a reference to a specific principal who is allowed to delegate, A* is one or more patterns which all valid delegation assertions must match, P* is one or more patterns identifying value entities that P may delegate to, C* is zero or more conditions on any delegation by P, I is the entity issuing the policy, and D is a time period during which the delegation authorization is valid.

6. The method of claim 1, wherein the second credential further comprises a second rule comprising a network connection type, and wherein the resource further validates the second credential by determining that second rule is satisfied by determining that the request was received by the resource over a network connection of the network connection type.

7. A method for a resource of a first organization to provide access thereto to a requestor of a second organization by way of a third organization, the first organization having a first administrator trusted by the resource, the second organization having a second administrator, the third organization having a third administrator, each administrator for issuing credentials to entities, each credential as issued by an administrator to an entity tying the entity to the issuing administrator and evincing a relationship between the entity and the issuing administrator, the method comprising:

the first administrator issuing to the third administrator a first credential by transmitting the first credential from a first administrator's computing device over a computer network to a third administrator's computing device, the first credential stating policy that the third administrator may issue a second credential to the second administrator on behalf of the first administrator and that the second administrator may issue a third credential to the requestor on behalf of the first administrator, the first credential comprising a public key of the third administrator (PU-C) and a signed private key of the first administrator (S(PR-A));

the third administrator issuing to the second administrator the second credential on behalf of the first administrator by transmitting the second credential from the third administrator's computing device over the computer network to a second administrator's computing device, the second credential comprising the first credential, a public key of the second administrator (PU-B), and a signed private key of the third administrator (S(PR-C));

the second administrator issuing to the requestor the third credential on behalf of the first administrator by transmitting the third credential from the second administrator's computing device over the computer network to a requestor's computing device, the third credential comprising the second credential, a validity period, a first rule comprising a plurality of time periods within the validity period during which a request for access to the resource of the first organization is accepted, a signed private key of the second administrator (S(PR-B)), and a public key of the third credential;

the requestor of the second organization transmitting the request for access to the resource of the first organization from the requestor's computing device over the computer network to the resource, the request comprising the third credential, and the resource comprising a resource computing device configured to provide access to digital content;

the resource receiving from the requestor the request comprising the third credential;

the resource obtaining a public key of the first administrator (PU-A);

the resource validating the third credential by:
applying the public key of the first administrator (PU-A) to the signed private key of the first administrator (S(PR-A)), obtaining the public key of the third administrator (PU-C) from the first credential, applying the public key of the third administrator (PU-C) to the signed private key of the third administrator (S(PR-C)), obtaining the public key of the second administrator (PU-B) from the second credential, applying the public key of the second administrator (PU-B) to the signed private key of the second administrator (S(PR-B)), determining that the first rule is satisfied by determining that the request was received by the resource during one of the plurality of time periods; and responsive to the resource validating the third credential, the resource encrypting the digital content with the public key of the third credential and transmitting encrypted digital content to the requestor over the computer network, whereby requestor decrypts the encrypted content with a private key of the third credential.

8. The method of claim 7 wherein the first administrator issues to the third administrator the first credential stating policy that the second administrator may issue the third credential to a particular set of entities including the requestor.

9. The method of claim 7 wherein the first administrator issues to the third administrator the first credential stating further policy that restricts rights the requestor has with regard to the resource.

10. The method of claim 7 comprising:
the first administrator issuing to the third administrator a first credential further stating policy that allows the requestor access to the resource.

11. The method of claim 7 comprising issuing each credential to include each policy therein specified as:

---
Principal P
    Has the right to assert
        Assertions matching A*
        To principals of type P*
        Subject to conditions C
    Issue by I
    Validity date-time D

--- where P is a reference to a specific principal who is allowed to delegate, A* is one or more patterns which all valid delegation assertions must match, P* is one or more patterns identifying value entities that P may delegate to, C* is zero or more conditions on any delegation by P, I is the entity issuing the policy, and D is a time period during which the delegation authorization is valid.

12. The method of claim 7, wherein the third credential further comprises a second rule comprising a network connection type, and wherein the resource further validates the third credential by determining that second rule is satisfied by determining that the request was received by the resource over a network connection of the network connection type.

13. A method for a resource of an organization to provide access thereto to a requestor by way of an intermediary, the organization having an administrator trusted by the resource, the method comprising:

the administrator issuing to the intermediary a first credential by transmitting the first credential from an administrator's computing device over a computer network to an intermediary's computing device, the first credential stating policy that the intermediary may issue a second credential to the requestor on behalf of the administrator, the first credential comprising a public key of the intermediary (PU-I) and a signed private key of the administrator (S(PR-A));

the intermediary issuing to the requestor the second credential on behalf of the administrator by transmitting the second credential from the intermediary's computing device over the computer network to a requestor's computing device, the second credential comprising the first credential, a validity period, a first rule comprising a plurality of time periods within the validity period during which a request for access to the resource of the organization is accepted, a signed private key of the intermediary, and a public key of the second credential;

the requestor transmitting over the computer network the request for access to the resource of the organization from the requestor's computing device, the request comprising the second credential, and the resource comprising a resource computing device configured to provide access to digital content;

the resource receiving from the requestor the request comprising the second credential;

the resource validating the second credential by:
    applying the public key of the administrator (PU-A) to the signed private key of the administrator (S(PR-A)), obtaining the public key of the intermediary (PU-I) from the first credential,
    applying the public key of the intermediary (PU-I) to the signed private key of the intermediary (S(PR-I)), and
    determining that the first rule is satisfied by determining that the request was received by the resource during one of the plurality of time periods; and responsive to the resource validating the second credential, the resource encrypting the digital content with the public key of the second credential and transmitting encrypted digital content to the requestor over the computer network, whereby the requestor decrypts the encrypted content with a private key of the second credential.

14. The method of claim 13 wherein the administrator issues to the intermediary the first credential stating policy that the intermediary may issue the second credential to a particular set of entities including the requestor.

15. The method of claim 13 wherein the administrator issues to the intermediary the first credential stating further policy that restricts rights the requestor has with regard to the resource.

16. The method of claim 13 comprising:
the administrator issuing to the intermediary a first credential further stating policy that allows the requestor access to the resource.

17. The method of claim 13 comprising issuing each credential to include each policy therein specified as:

---
Principal P
    Has the right to assert
        Assertions matching A*
        To principals of type P*
        Subject to conditions C
    Issue by I
    Validity date-time D

--- where P is a reference to a specific principal who is allowed to delegate, A* is one or more patterns which all valid delegation assertions must match, P* is one or more patterns identifying value entities that P may delegate to, C* is zero or more conditions on any delegation by P, I is the entity issuing the policy, and D is a time period during which the delegation authorization is valid.

18. The method of claim 13, wherein the second credential further comprises a second rule comprising a network connection type, and wherein the resource further validates the second credential by determining that second rule is satisfied by determining that the request was received by the resource over a network connection of the network connection type.

* * * * *